Sept. 27, 1955 J. N. MORRIS ET AL 2,719,035
MECHANISM FOR CONTROLLING THE SPEED OF PRIME MOVERS
Filed Feb. 10, 1953 6 Sheets-Sheet 1
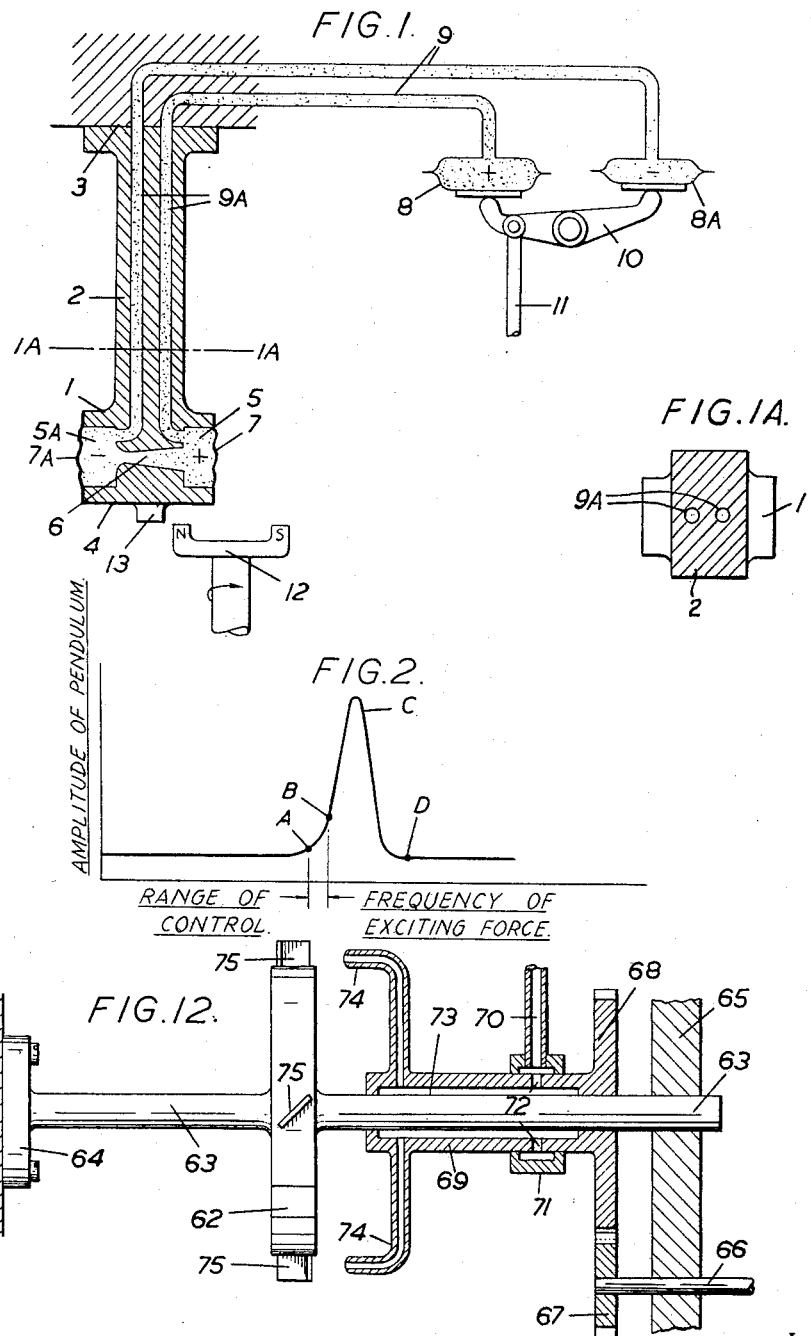

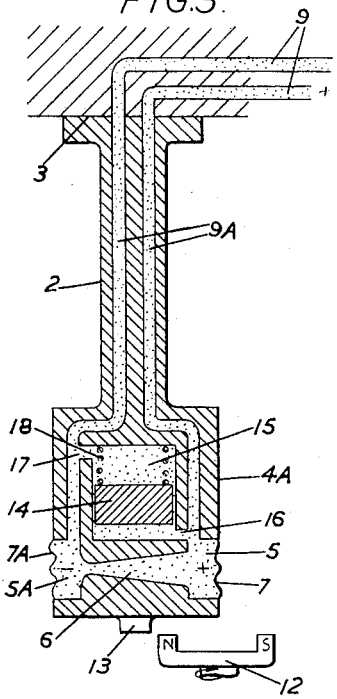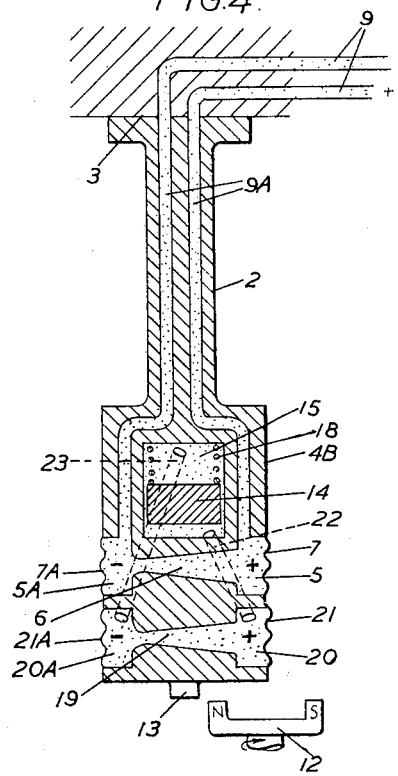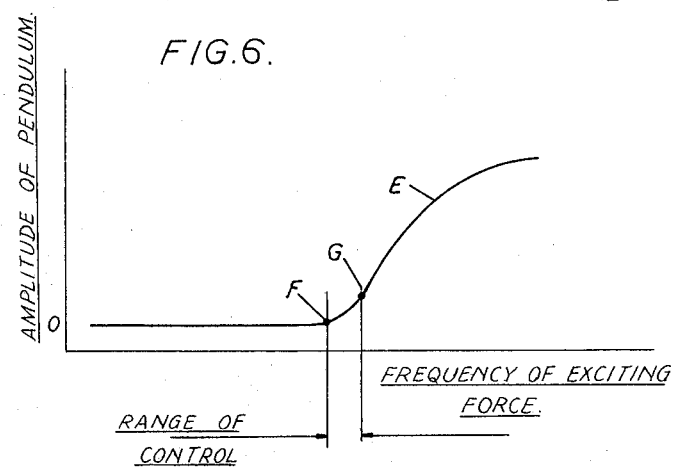

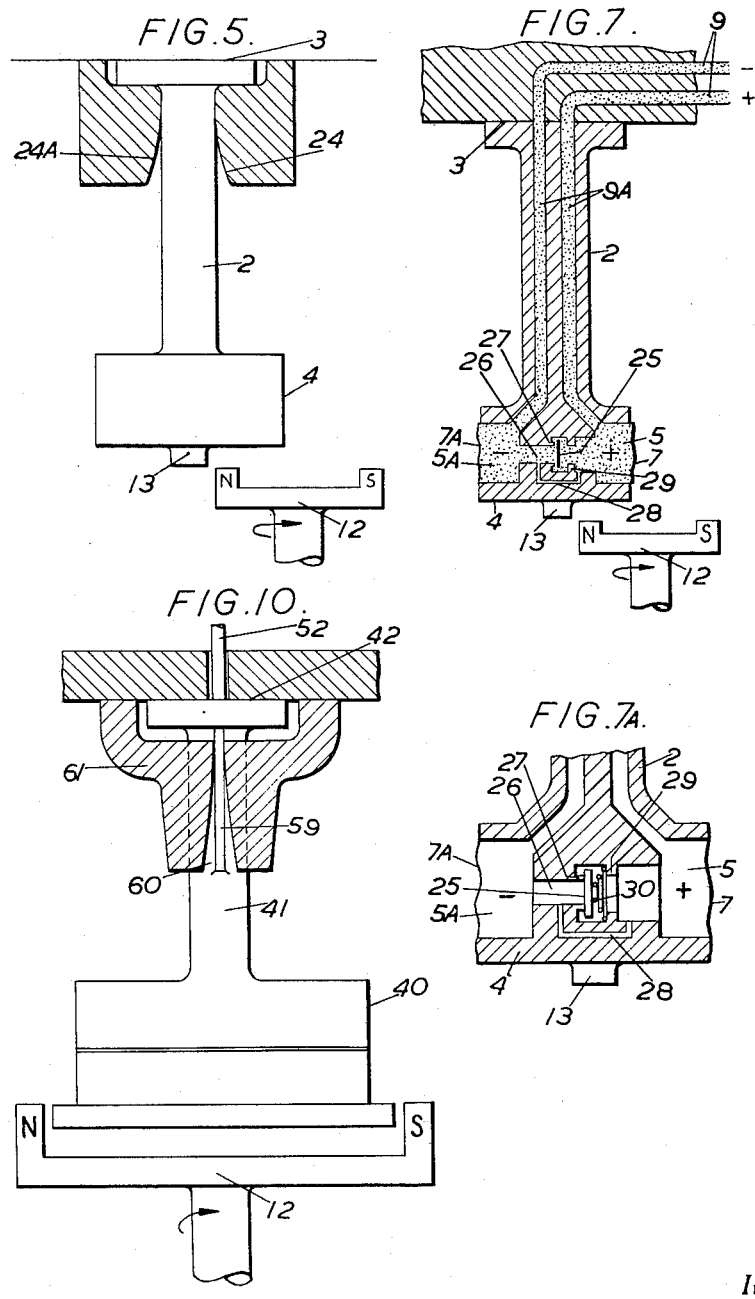

Sept. 27, 1955 J. N. MORRIS ET AL 2,719,035
MECHANISM FOR CONTROLLING THE SPEED OF PRIME MOVERS
Filed Feb. 10, 1953 6 Sheets-Sheet 4
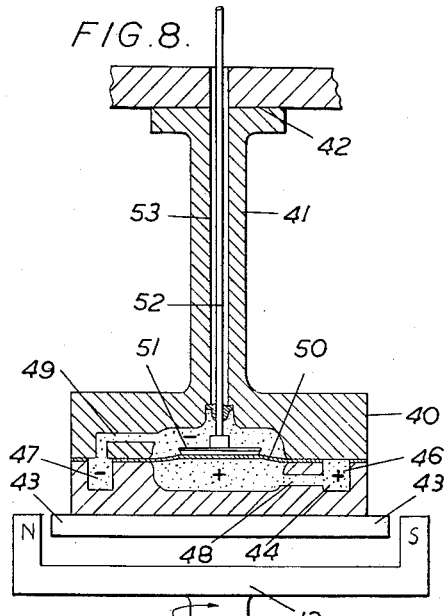
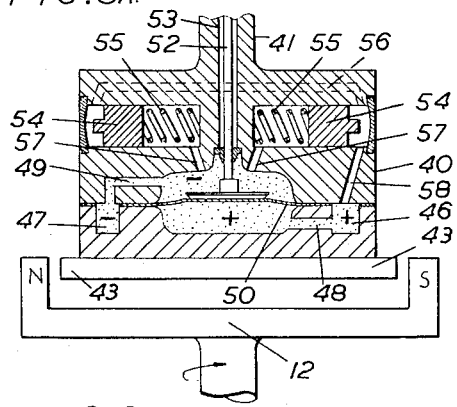
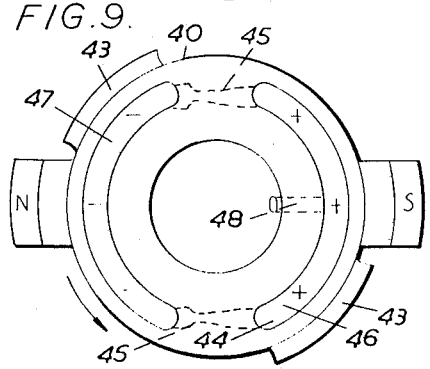
*Inventors*
John N. Morris
Lindsay G. Dawson
By
Holcombe, Wetherill & Brubee
*Attorneys*

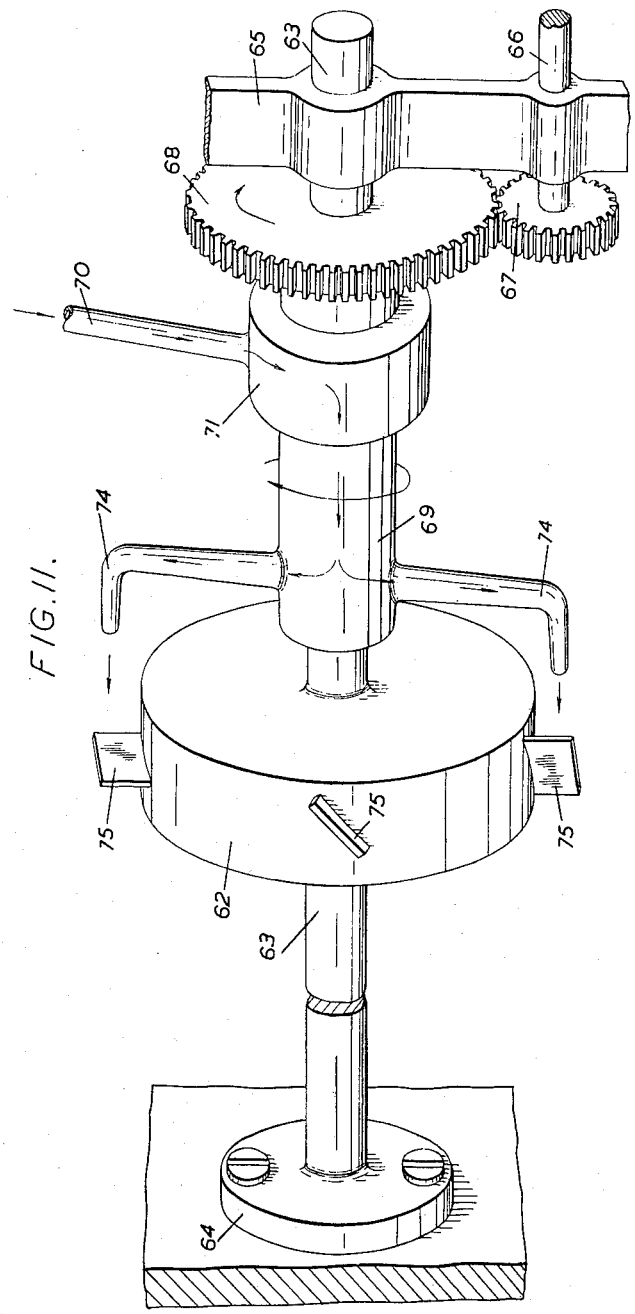

Sept. 27, 1955  J. N. MORRIS ET AL  2,719,035
MECHANISM FOR CONTROLLING THE SPEED OF PRIME MOVERS
Filed Feb. 10, 1953  6 Sheets—Sheet 6

Inventors
John N. Morris
Lindsay G. Dawson
By
Holcombe Wetherill & Brisebois
Attorneys

United States Patent Office

2,719,035
Patented Sept. 27, 1955

2,719,035

MECHANISM FOR CONTROLLING THE SPEED OF PRIME MOVERS

John Neville Morris, Birmingham, and Lindsay Grahame Dawson, Chaddesden, Derby, England, assignors to The S. U. Carburetter Company Limited, Birmingham, England, and Rolls-Royce Limited, Derby, England Application February 10, 1953, Serial No. 336,184

Claims priority, application Great Britain February 20, 1952

9 Claims. (Cl. 264—21)

This invention relates to mechanism for controlling the speed of prime movers such as internal combustion engines, gas turbines, steam engines and steam turbines so as automatically to prevent a predetermined rate of revolution from being exceeded. That is to say, the mechanism in question constitutes a speed-limiting governor.

For some purposes an engine or turbine is required to operate very close to its bursting speed, with the narrowest practicable margin of safety, and consequently a top speed governor of the greatest precision and reliability is called for in order to ensure that the chosen maximum permissible speed cannot be exceeded. It is the aim of this invention to provide speed-controlling mechanism capable of fulfilling that requirement.

The essence of the invention is that periodic impulses, of frequency correlated with the instantaneous rotational speed of the prime mover, are applied to an oscillatable control device which is capable of reacting effectively to them by resonant response only when their frequency approaches, i. e., is close to, or at, the value which corresponds to the predetermined maximum speed, and which thereupon brings about such adjustment of the throttle or other power output regulator of the prime mover as is necessary to govern the speed. The oscillatable control device comprises an elastically-constrained pendulum with a liquid-filled bob which is divided internally into two chambers having intercommunication through means permitting transference of liquid to take place from one chamber to the other more readily in one direction than in the opposite direction, and means are provided whereby a pressure difference, established between the two chambers by surging of the liquid due to oscillation of the pendulum, is applied to a pressure-responsive system arranged to control the power output regulator of the prime mover. For a reason which will be explained subsequently, it is advisable to include the provision of means operative, as soon as vibration of the pendulum has been initiated, to increase its natural frequency of vibration. As might be expected, the intensity of the signal produced by the control device when its pendulum is excited into oscillation is more powerful the higher the specific gravity of the liquid in the pendulum bob. Although other liquids may be capable of answering the purpose, mercury gives the best results.

A necessary feature of some forms of the invention is that each of the two chambers mentioned above is provided with a distensible wall. However, such provision need not be made when the control device has a torsional pendlulum.

Referring to the accompanying drawings:

Figure 1 represents diagrammatically, and in part section, one form of control device in accordance with the invention;

Figure 1A is a cross-section of the pendulum on the line 1A—1A in Fig. 1;

Figure 13:
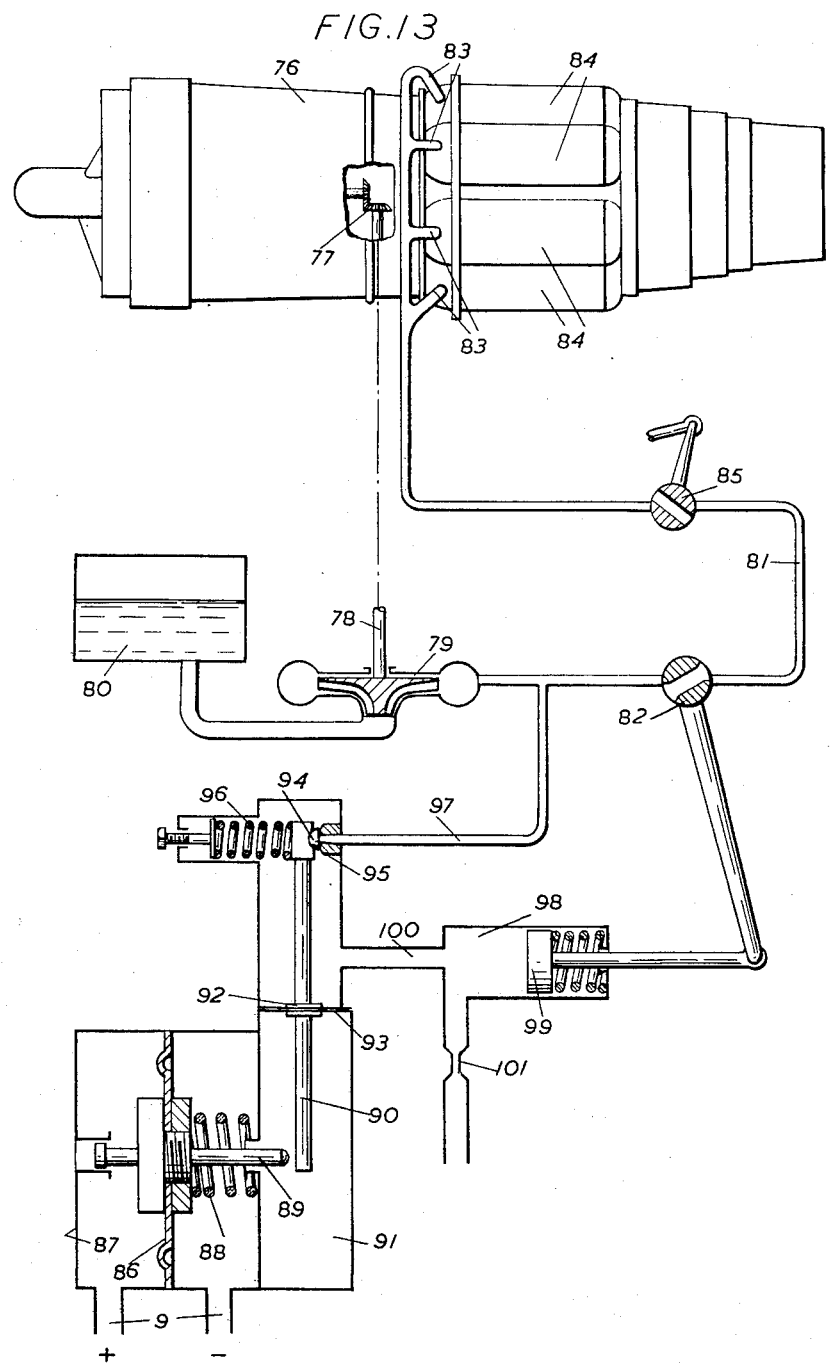

Figure 2 indicates the form of the response curve of the pendulum which forms part of the device shown in Figure 1;

Figure 3 shows, in section, one way of altering the moment of inertia of the pendulum illustrated in Figure 1;

Figure 4 represents a modification of the arrangement shown in Figure 3;

Figure 5 illustrates another method of altering the moment of inertia of the pendulum shown in Figure 1;

Figure 6 indicates the form of the response curve of a pendulum incorporating provision for altering its moment of inertia;

Figure 7 illustrates diagrammatically, in part section, a variant of the pendulum system embodied in Figure 1;

Figure 7A is an enlarged fragmentary sectional view showing a modification of part of the structure shown in Figure 7;

Figure 8 is an elevation, partly in section, of a torsional pendulum for use in carrying out the invention;

Fig. 8A is a fragmentary sectional view illustrating a modification of the arrangement show in Figure 8;

Figure 9 is a plan view of the lower part of the pendulum bob in Figures 8 and 8A;

Figure 10 is an elevation, partly in section, of a torsional pendulum having provision for altering its moment of inertia;

Figure 11 is a perspective view of another form of control device in accordance with the invention, incorporating a torsional pendulum;

Figure 12 is a side elevation, partly in section, of the arrangement shown in Figure 11; and Figure 13 is a diagrammatic illustration of servo mechanism for regulating the supply of fuel to a gas turbine in response to the operation of a control device in accordance with the invention.

In the arrangement shown diagrammatically in Figure 1 the oscillatable control device comprises a spring-constrained pendulum 1 having its rod constituted by a blade spring 2 which is clamped to a rigid support 3 at its upper end and carries a liquid-filled bob 4. The latter is divided internally into two chambers 5 and 5A which are in permanent intercommunication through a venturi-shaped duct 6 having its axis disposed in the general direction of the swing of the pendulum. Each of the chambers is provided with a distensible wall, as indicated at 7 and 7A respectively. Consequently, by reason of the flexing of those walls when the pendulum is caused to swing, liquid surges to and fro between the two chambers 5 and 5A by flowing through the venturi duct 6. Owing, however, to the greater facility with which the liquid can pass in one direction through the venturi duct than in the other direction, a valve-like effect is created which results in a higher mean pressure being built up in one of the chambers, namely the chamber 5. This pressure difference is applied to a pressure-responsive system comprising a pair of bellows or capsules 8 and 8A each of which is placed in permanent communication with the corresponding pendulum chamber through a pipe 9 and ducting 9A incorporated in the rod of the pendulum. The pressure-responsive devices 8 and 8A jointly act upon a see-saw lever 10 which, by means of a linkage 11, exercises control over the throttle or analogous power output regulator of the engine or turbine of which the top speed is to be governed.

A periodic exciting force, the frequency of which is proportional to the instantaneous rotational speed of the engine or turbine to be controlled, is applied to the pendulum bob 4 by any convenient means, such as an intermittent pneumatic jet or a series of impulses derived from an elastic member or from magnetic action. For example a rotating permanent magnet 12, driven from the prime mover, can be arranged to impart a series of impulses to an iron pole-piece 13 attached to the pendulum bob 4. But, whatever the means of excitation employed, the pendulum will remain substantially undisturbed until the frequency of the applied impulses closely approaches, or becomes the same as, its natural frequency of vibration. Marked oscillation of the pendulum bob is then induced, with the result already described. In consequence, the speed of the prime mover is automatically prevented from exceeding the predetermined maximum, and a condition of stable speed control achieved. This is preferably arranged to occur at a point at which the frequency of the exciting force falls just short of the natural frequency of free vibration of the pendulum, namely when the amplitude of the pendulum bob is substantially less than the maximum which would be attained were the applied frequency exactly equal to the natural frequency of free vibration.

Referring to Figure 2, the range of control extends approximately between the points A and B on the response curve C. No further control is exercised if the speed of the prime mover attains such a value that the applied frequency exceeds that represented for example by the point D on the curve. Accordingly, in order to obviate the possibility of the acceleration of the prime mover being too great for it to be arrested before the critical frequency of response had been exceeded, it is essential to arrange matters so that the throttle or other power output regulator is actuated by the top speed governor before the amplitude of the pendulum bob has passed its peak value at resonance. A convenient way of meeting this requirement is to make provision whereby as soon as vibration of the pendulum has been initiated, its natural frequency of vibration is increased. This can be effected by either of two methods: (a) altering the moment of inertia of the pendulum or (b) increasing the stiffness of its elastic suspension, i. e. the blade spring 2 carrying the bob 4.

As indicated in Figure 3, method (a) above can be carried out by accommodating in the pendulum bob 4A a spring-loaded piston 14, of appropriate mass, movable vertically in a liquid-filled cylinder 15 which has ports 16 and 17 so arranged that the spaces at opposite sides of the piston are each in open communication with the corresponding one of the chambers 5 and 5A at opposite ends of the venturi duct 6. The arrangement is such that the pressure difference established by the venturi duct when the pendulum is initially set into vibration is also effective to raise the piston against its spring 18, thereby diminishing the moment of inertia of the pendulum as a whole and so increasing its natural frequency of vibration. Alternatively, as shown in Figure 4, the same result can be achieved by providing in the pendulum bob 4B an independent venturi duct 19 and distensible chamber system for actuating the spring-loaded piston 14. In this case a chamber 20, having a distensible wall 21, communicates through a duct 22 with the space below the piston 14; and a chamber 20A, having a distensible wall 21A, communicates through a duct 23 with the space above the piston 14.

Method (b) above may conveniently be performed, as indicated in Figure 5, by providing the mounting 3 of the elastic suspension 2 with a pair of rigid, cam-like abutments 24 and 24A, so arranged as to apply a measure of constraint to the swing of the pendulum whereby its natural frequency is increased upon increase of amplitude.

Application of either of the two methods (a) and (b) results in a flatter response curve E (Fig. 6) being obtained, namely the curve representing the relation between the amplitude of the pendulum and the frequency of the exciting force. The range of control extends approximately between the points F and G on this curve.

Although, by virtue of its simplicity and lack of moving parts, the venturi duct is preferred as the means of establishing the required pressure difference referred to above, a non-return valve 25 (Fig. 7) may be employed instead to control a plain duct 26 which affords a seating 27 for the valve and interconnects the distensible chambers 5 and 5A in the pendulum bob 4. In that event the surging of the liquid which occurs when the pendulum is set in oscillation, causes the valve 25 to be seated and unseated at appropriate intervals, this effect being enhanced by the inertia of the valve itself, and a small return duct 28 is also provided to enable the pressure difference established to be dissipated as the vibration of the pendulum diminishes or ceases. An annular abutment 29 serves to retain the valve 28 in place.

Figure 7A illustrates a modification of the device shown in Figure 7, consisting in the provision of a light return spring 30 for loading the valve 25 against its seating 27.

The pendulum may equally be of the torsional type, in which case its bob 40 (Fig. 8) is carried by a torsion rod 41 the upper end of which is firmly clamped to a rigid support 42. The exciting impulses, by whatever means they are generated, are applied to the bob so as to induce torsional oscillation of the pendulum as its natural frequency is closely approached. In this connection it is convenient to provide the bob 40 with a pair of diametrically opposite iron pole-pieces 43 which are arranged to be acted upon by the rotating permanent magnet 12, driven from the prime mover. The bob 40 has a ring-shaped, liquid-filled tract 44 which, as can be seen from Figure 9, is partially obstructed at two zones by venturi ducts 45. In effect, these divide the tract 44 into a pair of intercommunicating sections or chambers 46 and 47. This arrangement does not require the distensible walls employed with the form of pendulum previously described. In the case of the embodiment under consideration, the pressure difference established between the respective sections 46 and 47 of the ring-shaped tract 44 when the pendulum suffers torsional oscillation is applied, by way of ducts 48 and 49, to a pressure-responsive member, such as a diaphragm 50 contained within the pendulum bob 40. The resultant deflection of this diaphragm is transmitted mechanically to the engine throttle or its equivalent through the agency of a diaphragm plate 51 and push rod 52, the latter extending freely through a passageway 53 provided in the pendulum rod 41 and its support 42.

Figure 8A illustrates a modification in which method (a) is employed. The pendulum bob 40A contains a diametrically opposite pair of pistons 54 each of which is caused to move radially inwards, against a restraining spring 55, in response to the pressure difference established between the chambers 46 and 47 when torsional oscillation of the pendulum occurs. The spaces in front of the respective pistons 54 are interconnected by a duct 56, and the space behind each of these pistons is connected by a duct 57 to the low-pressure side of the diaphragm 50. A duct 58 interconnects the space in front of one of the pistons 54 and the high-pressure side of the diaphragm 50.

The application of method (b) to the torsional pendulum arrangement is illustrated in Figure 10. In this case the upper part of the torsion rod 41 is formed with a straight spline 59 (or splines) for co-operation with cam-like abutments presented by the edges of a downwardly divergent slot 60 (or slots) formed in a member 61 rigid with the mounting of the pendulum.

In either of the arrangements exemplified by Figures 8 and 8A the venturi ducts 45 (Fig. 9) may be replaced by plain ducts each fitted with a non-return valve, as in Figure 7 or Figure 7A. Moreover, instead of employing the diaphragm 50, the pressure difference established between the chambers 46 and 47 upon oscillation of the pendulum may be applied, by way of ducts formed in the pendulum rod 41, to a pressure-responsive system of the kind represented at 8, 8A in Figure 1.

A torsional pendulum arranged to be excited pneumatically is illustrated in Figures 11 and 12. The pendulum bob 62 is fixed to, or formed integrally with, a torsion rod 63 which is firmly clamped at one end to a rigid support 64, and, at its other end is journalled in a bearing member 65. The latter also supports a spindle 66 which is arranged to be driven at a speed correlated with the instantaneous speed of the prime mover the maximum speed of which is to be governed. The spindle carries a pinion 67 meshing with a gear wheel 68 which is fixed to a sleeve 69 loosely mounted on the rod 63. Air under pressure, derived for example from the compressor unit in the case of a gas turbine or jet engine, is delivered by a pipe 70 to a stuffing box 71 surrounding the sleeve 69. This has radial ports 72 affording communication between the stuffing box and a longitudinal recess 73, which is provided with a pair of discharge pipes 74.

When the sleeve assembly is driven by the gearing 67, 68 the jets of air issuing from the rotating pipes 74 impinge intermittently upon inclined vanes 75 fixed to the periphery of the pendulum bob 62. Matters are so contrived that, as the frequency of the applied impulses closely approaches or attains the value which corresponds to the predetermined maximum speed of the prime mover, the resonant response of the pendulum brings about the requisite control of the power output regulator. It will be appreciated, of course, that the pendulum bob 62 and its rod 63 have the same internal parts, or their variants, and the same liquid circuit as has already been described in connection with Figures 8 and 8A.

Figure 13 illustrates diagrammatically an example of servo mechanism for regulating the supply of fuel to a gas turbine, in order to limit its maximum speed, in response to the operation of a control device in accordance with the invention. The gas turbine 76 drives, through gearing 77, the shaft 78 of a centrifugal fuel pump 79 which delivers from a tank 80, through a pipe 81 having a servo-controlled throttle valve 82, to fuel-injection points 83 in the combustion chambers 84 of the turbine. A shut-off cock 85 is provided between the throttle 82 and the fuel-injection points.

The pipes 9 of the control device (see, for example, Figure 1) are connected to the spaces at opposite sides of a diaphragm 86 mounted in a casing 87. The diaphragm is loaded by a spring 88, and has a thrust rod 89 operating on a bar 90 which is enclosed in a casing 91 and is hinged to it at 92, being mounted on a very flexible diaphragm 93. At its other end the bar 90 carries a hemispherical ball valve 94 which is normally held against its seat 95 by the action of an adjustable spring 96. The valve seat 95 is formed on a pipe 97 connected to the delivery side of the fuel pump 79. A servo cylinder 98, for actuating the throttle 82, which has its piston 99 spring-loaded in the throttle-opening direction, is provided with an inlet connection 100, controlled by the valve 94, and with an outlet restrictor 101.

When the pendulum of the control device responds sufficiently to the applied frequency, the resultant difference of pressure in the pipes 9 causes the diaphragm 86 to deflect against its spring-loading, thereby tilting the bar 90 so that the valve 94 is lifted from its seat. In consequence fuel from the pipe 97 flows into the servo cylinder 98, and the pressure in it builds up and effects closing of the throttle valve 82.

It is, of course, equally possible to employ a variable-stroke fuel pump in conjunction with a form of servo control similar to that just described, the system operating to reduce the stroke of the pump upon the governing speed of the prime mover being attained.

We claim:

1. Automatic mechanism for controlling the rotational speed of a prime mover having a power output regulator to prevent a predetermined rate of speed from being exceeded comprising means driven by the prime mover for producing periodic impulses of frequency correlated with the instantaneous rotational speed of the prime mover, an oscillatable control device adapted to respond to said impulses by resonant vibration when their frequency approaches that corresponding to said predetermined maximum rotational speed, and means responsive only to resonant vibration of said control device and connected to said power output regulator to actuate the latter to govern the speed of the prime mover as is necessary to prevent exceeding said predetermined rate, said oscillatable control device in said mechanism including an elastically constrained pendulum having a bob provided with two connected chambers confining a surging liquid for actuating the power output regulator.

2. Speed-controlling mechanism according to claim 1, in which the intercommunication between the two chambers is through means permitting transference of liquid to take place from one chamber to the other more readily in one direction than in the opposite direction, and means are provided whereby a pressure difference, established between the two chambers by surging of the liquid due to oscillation of the pendulum, is applied to a pressure-responsive system arranged to control the power output regulator of the prime mover.

3. Speed-controlling mechanism according to claim 2, including means operative, as soon as vibration of the pendulum has been initiated, to increase its natural frequency of vibration.

4. Speed-controlling mechanism according to claim 3, in which the said means for increasing the natural frequency of vibration of the pendulum comprises a spring-loaded mass which, under the action of the pressure difference established upon oscillation of the pendulum, is caused to move against its spring-loading to diminish the moment of inertia of the pendulum.

5. Speed-controlling mechanism according to claim 3, in which the said means for increasing the natural frequency of the pendulum comprises cam-like abutments incorporated in the mounting of the elastic suspension of the pendulum and arranged to apply a measure of constraint to the swing of the pendulum whereby its natural frequency is increased upon increase of amplitude.

6. Speed-controlling mechanism according to claim 2, in which each of the two chambers is provided with a distensible wall.

7. Speed-controlling mechanism according to claim 2, in which the means of intercommunication for the two chambers comprises a venturi-shaped duct.

8. Speed-controlling mechanism according to claim 2, in which the means of intercommunication for the two chambers comprises a duct controlled by a non-return valve, and a small return duct is provided to enable the pressure difference established to be dissipated when the vibration of the pendulum diminishes or ceases.

9. Speed-controlling mechanism according to claim 2, in which the pendulum is of the torsional type and its bob has a ring-shaped, liquid-filled tract which is partially obstructed at two zones by venturi ducts and is thereby divided into the said two intercommunicating chambers.

References Cited in the file of this patent

UNITED STATES PATENTS

| Number | Name | Date |
|---|---|---|
| 817,555 | Hartmann-Kempf | Apr. 10, 1906 |
| 1,624,093 | Davis | Apr. 12, 1927 |
| 2,322,003 | Farmer | June 15, 1943 |